(12) United States Patent
Knoll et al.

(10) Patent No.: US 8,575,269 B2
(45) Date of Patent: Nov. 5, 2013

(54) TRANSPARENT, TOUGH AND RIGID MOLDING COMPOSITIONS BASED ON STYRENE-BUTADIENE BLOCK COPOLYMER MIXTURES

(75) Inventors: Konrad Knoll, Mannheim (DE); Jürgen Koch, Neuhofen (DE); Piyada Charoensirisomboon, Mannheim (DE); Daniel Wagner, Bad Dürkheim (DE)

(73) Assignee: Styrolution GmbH (DE)

( * ) Notice: Subject to any disclaimer, the term of this patent is extended or adjusted under 35 U.S.C. 154(b) by 417 days.

(21) Appl. No.: 12/677,960

(22) PCT Filed: Sep. 3, 2008

(86) PCT No.: PCT/EP2008/061635
§ 371 (c)(1),
(2), (4) Date: Mar. 12, 2010

(87) PCT Pub. No.: WO2009/037115
PCT Pub. Date: Mar. 26, 2009

(65) Prior Publication Data
US 2010/0304067 A1 Dec. 2, 2010

(30) Foreign Application Priority Data

Sep. 14, 2007 (EP) .................... 07116456

(51) Int. Cl.
*C08L 53/02* (2006.01)
*B32B 3/12* (2006.01)
*B32B 1/08* (2006.01)

(52) U.S. Cl.
USPC ............. 525/89; 525/271; 525/314; 525/315; 525/316; 428/36.9; 428/116; 524/505

(58) Field of Classification Search
USPC ........... 525/89, 271, 314, 315, 316; 428/36.9, 428/116; 524/505
See application file for complete search history.

(56) References Cited

U.S. PATENT DOCUMENTS

| | | | |
|---|---|---|---|
| 3,639,517 | A | 2/1972 | Kitchen et al. |
| 4,038,469 | A | 7/1977 | Walker et al. |
| 4,304,881 | A | 12/1981 | Aoki et al. |
| 5,196,480 | A | 3/1993 | Seitz et al. |
| 6,031,053 | A | 2/2000 | Knoll et al. |
| 6,369,160 | B1 | 4/2002 | Knoll et al. |
| 6,521,712 | B1 | 2/2003 | Knoll et al. |
| 6,579,937 | B1 | 6/2003 | Güntherberg et al. |
| 6,593,430 | B1 | 7/2003 | Knoll et al. |
| 6,812,283 | B2 | 11/2004 | Duijzings et al. |
| 2002/0107323 | A1 | 8/2002 | Uzee et al. |
| 2004/0102576 | A1* | 5/2004 | Matsui et al. ................. 525/180 |
| 2005/0222331 | A1* | 10/2005 | Hoshi et al. ...................... 525/88 |
| 2008/0269414 | A1 | 10/2008 | Knoll et al. |
| 2009/0286918 | A1 | 11/2009 | Stewart et al. |
| 2010/0152387 | A1 | 6/2010 | Steininger et al. |
| 2010/0210766 | A1 | 8/2010 | Charoensirisomboon et al. |
| 2012/0108724 | A1* | 5/2012 | Obrecht ......................... 524/300 |

FOREIGN PATENT DOCUMENTS

| | | |
|---|---|---|
| CA | 1087339 A1 | 10/1980 |
| DE | 2550227 A1 | 5/1977 |
| DE | 2829625 | 1/1980 |
| DE | 19810141 A1 | 9/1999 |
| DE | 102005006137 A1 | 8/2006 |
| EP | 0022200 | 1/1981 |
| EP | 0450485 | 10/1991 |
| EP | 0654488 A1 | 5/1995 |
| EP | 0698639 A1 | 2/1996 |
| EP | 0730000 | 9/1996 |
| EP | 0766706 | 4/1997 |
| EP | 1260135 | 11/2002 |
| EP | 1619345 | 1/2006 |
| JP | 6025476 | 2/1994 |
| JP | 2007031611 | 2/2007 |
| WO | WO-00/36010 | 6/2000 |
| WO | WO-00/58380 A1 | 10/2000 |
| WO | WO-02/10222 | 2/2002 |
| WO | WO-03/046071 | 6/2003 |
| WO | WO-2005/103136 | 11/2005 |
| WO | WO-2006/058731 | 6/2006 |
| WO | WO-2006/074819 A1 | 7/2006 |
| WO | WO 2008/104481 | 9/2008 |
| WO | WO-2009/007358 | 1/2009 |

OTHER PUBLICATIONS

English translation of International Preliminary Search report in related PCT application mailed Aug. 26, 2010.
U.S. Appl. No. 12/278,400, filed Jan. 21, 2009, Urban et al.
Beckerle K et al: "Stereospecific post-metallacene polymerization catalysts: the example of isospecific styrene polymerization" Journal of Organometallic Chemistry, Elsevier-Sequoia S.A. Lausanne, CH, Bd. 689, Nr. 24, Nov. 29, 2004.
Cazzaniga, L.: "Synthesis and Characterization of Isotactic Polystyrene/Polybutadiene Block Coploymers" Macromolecules, Bd. 24, 1991, Seiten 5817-5822.
Gall Barbara T et al: "Molecular Weight and end group control of isotactic polystyrene using olefins and nonconjugated diolefins as chain transfer agents" Macromolecules, Bd. 41, Nr. 5, Feb. 7, 2008.
Ascenso, et al., "Isospecific Oligo-/Polymerization of Styrene with Soluble Cationic Nickel Complexes. The Influence of Phosphorus(III) Ligands," Macromolecules, vol. 29, 1996, pp. 4172-4179.

(Continued)

*Primary Examiner* — Mark Kaucher
(74) *Attorney, Agent, or Firm* — Novak Druce Connolly Bove + Quigg LLP

(57) ABSTRACT

A mixture which contains
a) a copolymer or block copolymer A comprising one or more copolymer blocks (B/S)A which are respectively composed of from 65 to 95% by weight of vinylaromatic monomers and of from 35 to 5% by weight of dienes, and whose glass transition temperature TgA is in the range from 40° to 90° C.,
b) a block copolymer B comprising at least one hard block S which is composed of vinylaromatic monomers, and comprising one or more copolymer blocks (B/S)B which are respectively composed of from 20 to 60% by weight of vinylaromatic monomers and of from 80 to 40% by weight of dienes, and whose glass transition temperature TgB is in the range from −70° to 0° C.,
c) a polystyrene C, and its use for the production of packaging for electronics components.

18 Claims, No Drawings

(56) References Cited

OTHER PUBLICATIONS

Cazzaniga et al., "Anionic Synthesis of Isotactic Polystyrene," Macromolecules, vol. 22, 1989, pp. 4125-4128.

Liu et al., "Synthesis of Isotactic Polystyrene with a Rare-Earth Catalyst," Journal of Polymer Science: Part A: Polymer Chemistry, vol. 36, 1998, pp. 1773-1778.

Makino, et al., "Anionic Synthessis of Highly Isotactic Polystyrene in Hexane in the Presence of Lithium Hydroxides," Macromolecules, vol. 32, 1999, pp. 5712-5714.

Po, et al., "Polymerization of Styrene with Nickel Complex/Methylaluminoxane Catalytic Systems," Journal of Polymer Science, Part A: Polymer Chemistry, vol. 36, 1998, pp. 2119-2126.

Crossetti, et al., "Polymerization of styrene to isotactic polymer with MAO-Ni(acac)$_2$. Examination of the factors that influence activity and stereospecificity," Macromol. Rapid Commun., vol. 18, 1997, pp. 801-808.

* cited by examiner

TRANSPARENT, TOUGH AND RIGID MOLDING COMPOSITIONS BASED ON STYRENE-BUTADIENE BLOCK COPOLYMER MIXTURES

CROSS-REFERENCE TO RELATED APPLICATIONS

This application is a national stage application (under 35 U.S.C. §371) of PCT/EP2008/061635, filed Sep. 3, 2008, which claims benefit of European application 07116456.0, filed Sep. 14, 2007.

BACKGROUND OF THE INVENTION

The invention relates to a mixture which comprises
a) from 95 to 30% by weight of a copolymer or block copolymer A comprising one or more copolymer blocks $(B/S)_A$ which are respectively composed of from 65 to 95% by weight of vinylaromatic monomers and of from 35 to 5% by weight of dienes, and whose glass transition temperature $Tg_A$ is in the range from 40° to 90° C.,
b) from 5 to 45% by weight of a block copolymer B comprising at least one hard block S which is composed of vinylaromatic monomers, and comprising one or more copolymer blocks $(B/S)_B$ which are respectively composed of from 20 to 60% by weight of vinylaromatic monomers and of from 80 to 40% by weight of dienes, and whose glass transition temperature $Tg_B$ is in the range from −70° to 0° C.,
c) from 0 to 40% by weight of polystyrene C, and
d) from 0 to 30% by weight of a block copolymer D comprising at least one copolymer block $(B/S)_A$ which is respectively composed of from 65 to 95% by weight of vinylaromatic monomers and of from 35 to 5% by weight of dienes, and whose glass transition temperature $Tg_A$ is in the range from 40° to 90° C., and comprising at least one diene block B or one copolymer block $(B/S)_B$ which is respectively composed of from 1 to 60% by weight of vinylaromatic monomers and of from 99 to 40% by weight of dienes, and whose glass transition temperature $Tg_B$ is in the range from −100° to 0° C.,
e) from 0 to 6% by weight of a plastifying agent, and its use for the production of packaging for electronics components.

U.S. Pat. No. 3,639,517 describes star-shaped branched styrene-butadiene block copolymers having from 75 to 95 percent by weight of terminal blocks composed of vinylaromatic monomers and from 5 to 30 percent by weight of elastomeric blocks mainly composed of conjugated diene units. They can be blended with standard polystyrene to give highly transparent mixtures. As the proportion of polystyrene increases, the modulus of elasticity increases at the cost of toughness. Mixtures with as little as about 40 percent by weight of polystyrene are too brittle for most applications. The possible amount of polystyrene admixed is mostly only from 20 to a maximum of 30 percent by weight, if acceptable ductility is to be retained.

WO 00/58380 describes star-shaped block copolymers having 40% by weight of hard blocks composed of vinylaromatic monomers and soft blocks having random structure composed of vinylaromatic monomers and dienes. To increase stiffness, they are blended with standard polystyrene, whereupon transparency falls. Even with 60 percent by weight of polystyrene they still give ductile mixtures. The disadvantage of these blends is clearly visible haze which is unacceptable for more demanding applications and components of relatively high thickness.

WO 2006/074819 describes mixtures of from 5 to 50% by weight of a block copolymer A comprising one or more copolymer blocks $(B/S)_A$ which are respectively composed of from 65 to 95% by weight of vinylaromatic monomers and of from 35 to 5% by weight of dienes, and whose glass transition temperature $Tg_A$ is in the range from 40° to 90° C., and from 95 to 50% by weight of a block copolymer B comprising at least one hard block S which is composed of vinylaromatic monomers, and comprising one or more copolymer blocks $(B/S)_B$ which are respectively composed of from 20 to 60% by weight of vinylaromatic monomers and of from 80 to 40% by weight of dienes, and whose glass transition temperature $Tg_B$ is in the range from −70° to 0° C., for the production of shrink films. The stiffness of the mixtures is in the range from 700 to at most 1300 MPa.

Blending of conventional styrene-butadiene block copolymers, such as Styrolux®, with polystyrene can be used to adjust the modulus of elasticity as desired up to above 3000 MPa, as a function of mixing ratio. However, experience has shown that there is a drastic loss of ductility at a modulus of elasticity above 1900 MPa. The mechanical behavior of the mixtures is then similar to that of polystyrene itself, and the mixtures lose their advantages over polystyrene.

Packaging materials for electronic components, for example tubes in which integrated circuits are transported, require a combination of high stiffness and ductility in association with safe exceeding of the yield stress, and good transparency. Polystyrene and its mixtures with styrene-butadiene block copolymers have not hitherto been suitable for these applications. The market has hitherto been serviced by polyvinyl chloride (PVC) or very expensive specialty polymers.

BRIEF SUMMARY OF THE INVENTION

The invention is related to a mixture comprising
a) from 95 to 30% by weight of a copolymer or block copolymer A comprising one or more copolymer blocks $(B/S)_A$ which are respectively composed of from 65 to 95% by weight of vinylaromatic monomers and of from 35 to 5% by weight of dienes, and whose glass transition temperature $Tg_A$ is in the range from 40° to 90° C.,
b) from 5 to 45% by weight of a block copolymer B comprising at least one hard block S which is composed of vinylaromatic monomers, and comprising one or more copolymer blocks $(B/S)_B$ which are respectively composed of from 20 to 60% by weight of vinylaromatic monomers and of from 80 to 40% by weight of dienes, and whose glass transition temperature $Tg_B$ is in the range from −70° to 0° C.,
c) from 0 to 40% by weight of polystyrene C,
d) from 0 to 30% by weight of a block copolymer D comprising at least one copolymer block $(B/S)_A$ which is respectively composed of from 65 to 95% by weight of vinylaromatic monomers and of from 35 to 5% by weight of dienes, and whose glass transition temperature $Tg_A$ is in the range from 40° to 90° C., and comprising at least one diene block B or copolymer block $(B/S)_B$ which is respectively composed of from 1 to 60% by weight of vinylaromatic monomers and of from 99 to 40% by weight of dienes, and whose glass transition temperature $Tg_B$ is in the range from −100° to 0° C., and
e) from 0 to 6% by weight of a plastifying agent E.

It was an object of the invention to find tough and rigid mixtures of styrene-butadiene block copolymers which simultaneously have high transparency. The mixtures should be processable to give molding compositions with high stiffness, and in particular should have a modulus of elasticity above 1500 to 2500 MPa combined with a certain ductility in the tensile test.

DETAILED DESCRIPTION OF THE INVENTION

The abovementioned mixture has accordingly been found.

Even small proportions of the block copolymer B raise the ductility of mixtures composed of block copolymer A and polystyrene markedly, without any significant loss of transparency. The proportion of polystyrene in the mixture at which retention of a certain ductility is observed depends on the ratio of block copolymer A to block copolymer B. The smaller this ratio, the larger the possible admixture of polystyrene. Block copolymer A/block copolymer B mixing ratios in the range from 90/10 to 70/30 are preferred, particular preference being given to those of about 80/20. If the block copolymer A/block copolymer B ratio is 80/20, the mixture preferably comprises from 35 to 40 percent by weight of polystyrene.

The mixture preferably comprises from 60 to 80% by weight of the copolymer or block copolymer A, from 20 to 40% by weight of the block copolymer B, and from 0 to 20% by weight of polystyrene C. The mixture can also comprise, alongside the block copolymers A and B, and polystyrene C, relatively small amounts of further thermo-plastic polymers, and from 1 to 6% by weight of conventional auxiliaries, such as plastifying agents E.

Within the inventive constitution of the block copolymer mixtures, various morphologies can be formed. Particularly transparent, tough and rigid molding compositions have three different domains, where two domains form the hard phase and one domain forms the soft phase. A honeycomb morphology is sometimes observed, composed of three phases. Two discontinuous phases are formed by the incompatible copolymers or block copolymers A and polystyrene C. These two hard phases are separated by a soft phase which is formed by the block copolymer B. The soft phase B adopts a position at the phase boundary between the incompatible hard phases of the block copolymer B and polystyrene C.

At proportions of up to 30% by weight of polystyrene C, particle morphologies can be formed with particles matched to the refractive index of the matrix. The matrix formed from the block copolymer A and the rubber particles formed from the block copolymers B and from polystyrene C have the same refractive index here. Mixtures with this morphology behave like impact-resistant polystyrene, but are transparent (clear HIPS). Admixture of the block copolymers D can promote formation of this morphology.

The three-phase system arises on mixing of the copolymers or block copolymers A with the block copolymers B and polystyrene C, and can be discerned by electron microscopy on specimens of the extruded mixture. Surprisingly, it has been found that in the case of a three-phase system where two incompatible or partially compatible hard phases are present the total proportion of hard phase can be raised to the extent that the desired range of modulus of elasticity above 1900 MPa is achieved without major loss of ductility.

Copolymer or Block Copolymer A:

The mixture comprises from 30 to 95% by weight, preferably from 60 to 80% by weight, of a copolymer or block copolymer A, comprising one or more copolymer blocks $(B/S)_A$ which are respectively composed of from 65 to 95% by weight of vinylaromatic monomers and of from 35 to 5% by weight of dienes, and whose glass transition temperature $Tg_A$ is in the range from 40° to 90° C.

The glass transition temperature of the copolymer block $(B/S)_A$ is preferably in the range from 50 to 70° C. The glass transition temperature is affected by the comonomer constitution and can be determined by differential scanning calorimetry (DSC) or differential thermal analysis (DTA), or calculated from the Fox equation. The copolymer block $(B/S)_A$ is preferably composed of from 80 to 90% by weight of styrene and from 10 to 20% by weight of butadiene.

Preference is given to copolymers or block copolymers A which comprise one or more copolymer blocks $(B/S)_A$ which are composed of vinylaromatic monomers and of dienes with random distribution. These can by way of example be obtained by anionic polymerization using alkyllithium compounds in the presence of randomizers, such as tetrahydrofuran or potassium salts. It is preferable to use potassium salts with a ratio of anionic initiator to potassium salt in the range from 25:1 to 60:1. This can simultaneously achieve a low proportion of 1,2 linkages of the butadiene units.

The proportion of 1,2 linkages of the butadiene units is preferably in the range from 8 to 15%, based on the entirety of 1,2,1,4-cis, and 1,4-trans linkages.

It is particularly preferable that the copolymer or block copolymer A is composed of a single copolymer block $(B/S)_A$, or has linear structures, such as $S-(B/S)_A$ or $S-(B/S)_A-S$ where S is respectively a hard block composed of vinylaromatic monomers. Preference is equally given to star polymers $[(B/S)_A]X_n$ having n branches in the star, these being obtainable by coupling using an n-functional coupling agent or by initiation using an n-functional initiator. An example of a suitable coupling agent is epoxidized vegetable oil, such as epoxidized linseed oil or epoxidized soybean oil. This gives stars having from 3 to 5 branches. Equal preference is given to $[S-(B/S)_A]X_n$ star block copolymers.

However, random copolymers $(B/S)_A$ can also be prepared by free-radical polymerization.

The weight-average molar mass $M_W$, of the copolymer block $(B/S)_A$ is generally in the range from 50 000 to 400 000 g/mol, preferably in the range from 60 000 to 200 000 g/mol, particularly preferably in the range from 100 000 to 160 000 g/mol. For the structures such as $S-(B/S)_A$ or $S-(B/S)_A-S$, the weight-average molar mass $M_W$ is preferably in the range from 15 000 to 45 000 g/mol for each block S. The blocks S are preferably composed of styrene units. In the case of the anionically prepared polymers, molar mass is controlled by way of the ratio of amount of monomer to amount of initiator. However, it is also possible to make multiple additions of initiator after previous feed of the monomer, the result then being bi- or multimodal distribution. In the case of polymers prepared by a free-radical route, $M_W$ is adjusted by way of the polymerization temperature and/or addition of regulators.

The copolymers or block copolymers A are generally not compatible with standard polystyrene.

Block Copolymer B

The inventive mixture comprises, as block copolymer B, from 5 to 45% by weight, preferably from 20 to 40% by weight, of a block copolymer B comprising at least one hard block S which is composed of vinylaromatic monomers, and comprising one or more copolymer blocks $(B/S)_B$ which are respectively composed of from 20 to 60% by weight of vinylaromatic monomers and of from 80 to 40% by weight of dienes, and whose glass transition temperature $Tg_B$ is in the range from −70° to 0° C., preferably in the range from −65° C. to −20° C.

Particularly suitable block copolymers B are rigid block copolymers which are composed of from 60 to 90% by weight of vinylaromatic monomers and of from 10 to 40% by weight of diene, based on the entire block copolymer, and whose structure is mainly composed of hard blocks S comprising vinylaromatic monomers, in particular styrene, and of soft blocks B or B/S comprising dienes, such as butadiene and isoprene. Particular preference is given to block copolymers having from 70 to 80% by weight of styrene and from 20 to 30% by weight of diene.

The copolymer blocks $(B/S)_B$ of the block copolymer B preferably have random distribution of the vinylaromatic monomers and dienes.

Preferred block copolymers B have a star-shaped structure having at least two terminal hard blocks $S_1$ and $S_2$ with different molecular weight composed of vinylaromatic monomers, where the proportion of the entirety of the hard blocks S is at least 40% by weight, based on the entire block copolymer B. Linear structures, such as $(B/S)_B-S_2$ or $S_1-(B/S)_B-S_2$, are also possible. The number-average molar mass $M_n$ of the terminal blocks $S_1$ is preferably in the range from 5000 to 30 000 g/mol, and the number-average molar mass $M_n$ of $S_2$ is preferably in the range from 35 000 to 150 000 g/mol.

Preference is given to polymodal styrene-butadiene block copolymers having terminal styrene blocks, such as those described by way of example in DE-A 25 50 227 or EP-A 0 654 488.

Particular preference is given to block copolymers B having at least two hard blocks $S_i$ and $S_2$ which are composed of vinylaromatic monomers, and having, between these, at least one random soft block $(B/S)_B$ which is composed of vinylaromatic monomers and dienes, where the proportion of the hard blocks is above 40% by weight, based on the entire block copolymer, and the 1,2-vinyl content in the soft block B/S is below 20%, these being as described in WO 00/58380.

The block copolymers B are commercially available by way of example with trademarks Styrolux® 3G 33/Styroclear® GH 62, K-Resin® 03, K-Resin® 01, Kraton® D 1401 P, or Styrolux® 3G 55, Styrolux® BX 6205, Styrolux BX® 6415, or K-Resin® XK40.

Polystyrene C

The polystyrene used can comprise any of the standard (GPPS) or impact-resistant (HIPS) polystyrenes. The amount generally used is from 0 to 40% by weight, preferably from 30 to 40% by weight, of relatively high-molecular-weight polystyrenes whose average molar mass $M_W$ is in the range from 220 000 to 500 000 g/mol.

Block Copolymer D

The inventive mixture can moreover comprise from 0 to 30% by weight, in particular from 5 to 20% by weight, of a block copolymer D comprising at least one diene block B or one copolymer block $(B/S)_A$ which is respectively composed of from 65 to 95% by weight of vinylaromatic monomers and of from 35 to 5% by weight of dienes, and whose glass transition temperature $Tg_A$ is in the range from 40° to 90° C., and comprising at least one copolymer block $(B/S)_B$ which is respectively composed of from 1 to 60% by weight, preferably from 20 to 60% by weight, of vinylaromatic monomers and of from 99 to 40% by weight, preferably from 80 to 40% by weight, of dienes, and whose glass transition temperature $Tg_B$ is in the range from −100° to 0° C., preferably from −70 to 0° C.

The constitution and properties of the copolymer blocks $(B/S)_A$ and $(B/S)_B$ preferably correspond to that of the corresponding blocks described for the block copolymers A and B. The diene block B is composed exclusively of diene monomer units, in particular butadiene and/or isoprene.

The structures of the block copolymers D are preferably $(S/B)_A-(S/B)_B-S$ or $(S/B)_A-B-S$.

Plastifying Agent E

The plastifying agent E used can comprise from 0 to 6% by weight, preferably from 2 to 4% by weight, of a homogeneously miscible oil or oil mixture, in particular white oil or dioctyl adipate, or a mixture of these.

The inventive mixtures are highly transparent and are particularly suitable for the production of packaging for electronics components, in particular tubular packaging for integrated circuits (IC).

EXAMPLES

Copolymer and Block Copolymer A

To prepare a linear styrene-butadiene block copolymer A1 of structure B/S, 2991 ml of cyclohexane were used as initial charge, titrated to completion at 60° C. with 1.6 ml of sec-butyllithium (BuLi), and then 5.19 ml of a 1.4 M sec-butyllithium solution for initiation were admixed, as also was 0.74 ml of a 0.329 M potassium tert-amylate (PTA) solution as randomizer, and the mixture was cooled to 59° C. 1440 g of styrene and 160 g of butadiene were then simultaneously added in a plurality of portions, and the maximum temperature was restricted to 77° C. by countercurrent cooling. The living polymer chains were then terminated by adding 0.83 ml of isopropanol, and the mixture was acidified with 1.0% of $CO_2$/0.5% of water, based on solids, and a stabilizer solution was added (0.2% of Sumilizer GS and 0.2% of Irganox 1010, based in each case on solids). The cyclohexane was evaporated in a vacuum drying oven.

The glass transition temperature of the copolymer with structure (S/B) with molar mass 220 000 g/mol was 67° C., measured by DSC.

The block copolymer A2 was prepared by analogy with A1 and 5% by weight of white oil (medicinal white oil with viscosity of 70 centistokes at 40° C.) was admixed.

Block Copolymer B

A star-shaped block copolymer B1 (26% by weight of butadiene, 74% by weight of styrene) having random copolymer blocks B/S was prepared by sequential anionic polymerization of styrene and butadiene and subsequent coupling with epoxidized linseed oil, as in example 17 of WO 00/58380.

Component C

The component C1 used comprised standard polystyrene PS158 K with $M_W$ of 270 000 g/mol and with $M_n$ of 103 000 g/mol, from BASF Aktiengesellschaft.

The component C2 used comprised standard polystyrene PS165H with $M_W$ of 300 000 g/mol and with a proportion of 3.5% by weight of white oil (medicinal white oil with viscosity of 70 centistokes at 40° C.).

Component D

The component D1 used comprised a linear block copolymer of structure $(S/B)_A-(S/B)_B-S$ with the block proportions (25-50-25).

The component D2 used comprised a linear block copolymer of structure $(S/B)_A-B-S$ with the block proportions (30-40-30).

The component D3 used comprised a linear block copolymer of structure $(S/B)_A-(S/B)_B-S$ with the block proportions (33-34-33) and with a total molar mass of 210 000 g/mol. The S/B ratio was 90/10 in block A and 20/80 in block B. The DSC curve showed respectively a glass transition temperature at −84° C. and +82° C.

Mixtures M1 to M19

The block copolymer mixtures were respectively prepared by melting of the parts by weight stated in table 5 of the block copolymers A1, A2, and B1, and also of components C (polystyrene PS158 K), and D, in an extruder, and were then extruded to give tubes or pressed to give sheets or foils.

Mechanical properties, such as modulus of elasticity, stress, and strain were determined to ISO 527.

The transmission measurements were made in the range from 400 to 700 nm. The haze of the specimens was evaluated on a scale of grades from 1 (very good) to 5 (very poor).

Bending force was determined using a flexural test on a tube at 5 cm of deflection at a distance of 1 m.

Toughness was evaluated as follows in the buckling test by bending a tube over an angled edge (45 and)90°:1= no cracking, 2= cracking but no fracture, 3= fracture at 90°, 4= brittle, premature fracture.

Inventive Examples M1 to M4

Mixtures composed of the copolymer A1 (random styrene-butadiene copolymer which is composed of 10% by weight of butadiene and 90% by weight of styrene and whose glass transition temperature $T_g$ is 70° C.) and of block copolymer B1 (styrene-butadiene block copolymer having 26% by weight of butadiene and 74% by weight of styrene) were mixed at from 200 to 230° C. in a 16 mm twin-screw extruder and processed by way of a flat-film die to give a foil of thickness 1 mm. The mixing ratios and the mechanical and optical properties of the foils are collated in table 1. They show very high transparency.

TABLE 1

| Inventive example | M1 | M2 | M3 | M4 |
|---|---|---|---|---|
| Constitution | | | | |
| A1 [% by weight] | 65 | 70 | 75 | 80 |
| B1 [% by weight] | 35 | 30 | 25 | 20 |
| Mechanical properties, parallel | | | | |
| Modulus of elasticity [N/mm²] | 1430 | 1520 | 1740 | 1930 |
| Tensile stress at break [N/mm²] | 22 | 25 | 25 | 25 |
| Tensile strain at break [%] | 15.5 | 20.4 | 20.5 | 4.4 |
| Mechanical properties, transverse | | | | |
| Modulus of elasticity [N/mm²] | 1390 | 1650 | 1840 | 2090 |
| Tensile stress at break [N/mm²] | 23 | 25 | 27 | 30 |
| Tensile strain at break [%] | 16.1 | 3.7 | 3.4 | 2.4 |
| Optical properties | | | | |
| Transparency [%] | 76 | 79 | 79 | 80 |
| Haze [%] | 12.8 | 10.4 | 10.5 | 80.1 |
| Yellowness Index YI [%] | 14.5 | 13.0 | 13.4 | 10.2 |

Examples M5 to M17 and Comparative Example V1

Components A1, A2, B1, C1, and C2 were mixed in accordance with the proportions by weight stated in table 2, and extruded to give tube profiles. Table 3 collates the properties. Table 4 shows the mechanical and optical properties of selected mixtures measured on extruded films of thickness 1 mm. The mixtures M7 and M8 exhibit a regular particle structure. The refractive indices of the particles have been matched with those of the matrix. They therefore behave like transparent impact-modified polystyrene

TABLE 2

| | A1 | A2 | B1 | C1 | C2 | Bending force [g] | Toughness (buckling test) | Haze |
|---|---|---|---|---|---|---|---|---|
| M5 | 24 | | 40 | 36 | | 606 | 1 | 4 |
| M6 | 24 | | 40 | | 36 | 593 | 2 | 5 |
| M7 | 70 | | 15 | | 15 | 707 | 4 | 2-3 |
| M8 | 60 | | 20 | | 20 | 660 | 4 | 3 |
| M9 | 50 | | 25 | | 25 | 673 | 4 | 4 |
| M10 | 55 | | 20 | | 25 | 698 | 4 | 4 |
| M11 | 50 | | 20 | | 30 | 696 | 4 | 4 |
| M12 | 45 | | 25 | | 30 | 675 | 4 | 4-5 |
| M13 | 40 | | 30 | | 30 | 650 | 2 | 5 |
| M14 | | 24 | 40 | 36 | | 620 | 3 | 3-4 |
| M15 | | 24 | 40 | | 36 | 607 | 3 | 4 |
| M16 | | 60 | 20 | | 20 | 695 | 4 | 2 |
| M17 | | 50 | 20 | | 30 | 705 | 4 | 2 |
| V1 | 20 | | 50 | | 30 | 494 | 1 | 4 |

TABLE 3

| | M11 | M12 | M13 |
|---|---|---|---|
| Modulus of elasticity [MPa], longitudinal | 2476 | 2283 | 2178 |
| Modulus of elasticity [MPa], transverse | 2167 | 1846 | 1572 |
| Tensile strain at break [%], longitudinal | 28.8 | 8.1 | 24.9 |
| Tensile strain at break [%], transverse | 9.1 | 16.7 | 16.1 |
| Transparency [%] | 82.3 | 79.4 | 77.3 |
| Haze [%] | 8.6 | 9.7 | 11.4 |

Inventive Examples M18 and M21

Components A1, B1, C1, and D1, D2, or D3 were mixed in accordance with the proportions by weight stated in table 4, and pressed at 160° C. to give sheets of thickness 4 mm. Table 4 collates the properties.

TABLE 4

| | A1 | B1 | C1 | D | Modulus of elasticity [MPa] | Tensile strain at break [%] | Transparency [%] |
|---|---|---|---|---|---|---|---|
| M18 | 40 | 5 | 40 | 5 D1/ 10 D2 | 2130 | 50 | 50.4 |
| M19 | 30 | 30 | 30 | 10 D3 | 1951 | 20.4 | 75.8 |
| M20 | 35 | 20 | 35 | 10 D3 | 2043 | 39.3 | 69.2 |
| M21 | 40 | 10 | 40 | 10 D3 | 2495 | 9.2 | 66.7 |

The invention claimed is:
1. A mixture comprising
   a) at least 30% by weight of a copolymer or block copolymer A comprising one or more copolymer blocks $(B/S)_A$ which are respectively composed of from 65 to 95% by weight of vinylaromatic monomers and of from 35 to 5% by weight of dienes, and whose glass transition temperature $Tg_A$ is in the range from 40° to 90° C.,
   b) at least 20% by weight of a block copolymer B comprising at least one hard block S which is composed of vinylaromatic monomers, and comprising one or more copolymer blocks $(B/S)_B$ which are respectively composed of from 20 to 60% by weight of vinylaromatic monomers and of from 80 to 40% by weight of dienes, and whose glass transition temperature $Tg_B$ is in the range from −70° to 0° C.,
   c) from 30 to 40% by weight of polystyrene C, d) at least 5% by weight of a block copolymer D comprising at least one copolymer block $(B/S)_A$ which is respectively composed of from 65 to 95% by weight of vinylaromatic monomers and of from 35 to 5% by weight of dienes, and whose glass transition temperature $Tg_A$ is in the range from 40° to 90° C., and comprising at least one diene block B or copolymer block $(B/S)_B$ which is respectively composed of from 1 to 60% by weight of vinylaromatic monomers and of from 99 to 40% by weight of dienes, and whose glass transition temperature $Tg_B$ is in the range from −100° to 0° C., wherein component d) is $(S/B)_A$-$(S/B)_B$ or $(S/B)_A$-B-S, and e) from 0 to 6% by weight of a plastifying agent E.

2. The mixture according to claim 1, wherein the number-average molar mass $M_n$ of the copolymer block $(B/S)_A$ of the copolymer or block copolymer A is from 50 000 to 150 000 g/mol.

3. The mixture according to claim 1, wherein the glass transition temperature of the copolymer block $(B/S)_A$ of the copolymer or block copolymer A is in the range from 60° to 80° C.

4. The mixture according to claim 1, wherein the copolymer or block copolymer A is composed of one copolymer block $(B/S)_A$.

5. The mixture according to claim 1, wherein the copolymer or block copolymer A is composed of one copolymer block $(B/S)_A$ and the glass transition temperature of the copolymer block $(B/S)_A$ of the copolymer or block copolymer A is in the range from 60° to 80° C.

6. The mixture according to claim 1, wherein the block copolymer A has the structure S-$(B/S)_A$-S where S is a hard block composed of vinylaromatic monomers.

7. The mixture according to claim 5, wherein the block copolymer A has the structure S-$(B/S)_A$-S where S is a hard block composed of vinylaromatic monomers.

8. The mixture according to claim 1, wherein the copolymer blocks $(B/S)_A$ and $(B/S)_B$ of the block copolymers A and B have random distribution of the vinylaromatic monomers and dienes.

9. The mixture according to claim 1, wherein the block copolymer B has a star-shaped structure having at least two terminal hard blocks $S_1$ and $S_2$ with different molecular weight which are composed of vinylaromatic monomers, and the proportion of the entirety of the hard blocks S is at least 40% by weight, based on the entire star-shaped block copolymer B.

10. The mixture according to claim 7, wherein the block copolymer B has a star-shaped structure having at least two terminal hard blocks $S_1$ and $S_2$ with different molecular weight which are composed of vinylaromatic monomers, and the proportion of the entirety of the hard blocks S is at least 40% by weight, based on the entire star-shaped block copolymer B.

11. The mixture according to claim 9, wherein the star-shaped block copolymer B has terminal blocks $S_1$ whose number-average molar mass $M_n$ is in the range from 5000 to 30 000 g/mol, and $S_2$ whose number-average molar mass $M_n$ is in the range from 35 000 to 150 000 g/mol.

12. The mixture according to claim 1, wherein the extruded mixture has a three-phase honeycomb structure.

13. A packaging for electronic components which comprises the mixture according to claim 1.

14. A tubular packaging for integrated circuits, produced from the mixture according to claim 1.

15. The mixture according to claim 1, wherein the mixture has a modulus of elasticity of 1740 to 2500 MPa.

16. The mixture according to claim 1, wherein the mixture has a modulus of elasticity of 1900 to 2500 MPA.

17. The mixture according to claim 1, wherein component e) is present in an amount from 2 to 4% by weight.

18. The mixture according to claim 17, wherein component e) is a homogenously miscible oil or oil mixture.

\* \* \* \* \*